Jan. 11, 1955

A. H. FAULKNER 2,699,467

TELEPHONE SYSTEM AND A RELAYLESS LINE CIRCUIT AND CIRCUITS IN COOPERATION THEREWITH FOR EXTENDING A CALL

Filed March 16, 1951

3 Sheets-Sheet 1

INVENTOR.
ALFRED H. FAULKNER

BY *McWalter Owen*

ATTORNEY

INVENTOR.
ALFRED H. FAULKNER
BY Mc Walter Owen
ATTORNEY

Jan. 11, 1955 A. H. FAULKNER 2,699,467

TELEPHONE SYSTEM AND A RELAYLESS LINE CIRCUIT AND CIRCUITS IN COOPERATION THEREWITH FOR EXTENDING A CALL

Filed March 16, 1951 3 Sheets-Sheet 3

INVENTOR.
ALFRED H. FAULKNER

BY Wm. Walter Owen

ATTORNEY 2,699,467

TELEPHONE SYSTEM AND A RELAYLESS LINE CIRCUIT AND CIRCUITS IN COOPERATION THEREWITH FOR EXTENDING A CALL

Alfred H. Faulkner, Chicago, Ill., assignor to Automatic Electric Laboratories, Inc., Chicago, Ill., a corporation of Delaware Application March 16, 1951, Serial No. 216,034

16 Claims. (Cl. 179—18)

This invention relates in general to telephone systems, and more particularly to a relayless line circuit and circuits in cooperation therewith for extending a call.

The customary line circuit for telephone exchanges requires one or more relays therein. Relays are rather expensive and require accurate adjustments.

Accordingly, an important object of the present invention is to provide a relayless line circuit.

Another object of the present invention is to provide a line circuit that is economical to manufacture by the use, in lieu of relays, of resistors and an asymmetrical conductor.

Another object of the present invention is to provide a call allotter having a vacuum tube therein for testing and completing pulsing circuits.

Another object of the present invention is to provide a connector having a relay performing the dual function of testing and switch-through operation in cooperation with a relayless line circuit.

Another object of the present invention is to provide a call allotter having circuits therein to function as a calling line detector, line group testing, and for preselecting an idle line finder.

Other objects will appear upon further perusal of the detailed description taken in conjunction with the accompanying drawings which show the preferred embodiments of the present invention.

The present invention is shown in its preferred embodiments and is adapted for use in a Strowger type telephone exchange. However, it may suitably be adapted for use with other systems, such as a rotary, all-relay or electronic. The novel relayless line circuit herein provided has the usual line relay and cut-off relay eliminated. In lieu thereof, suitable means such as a network comprising resistors and rectifiers are herein provided to perform the normal functions of the line and cut-off relays.

Figure 1:
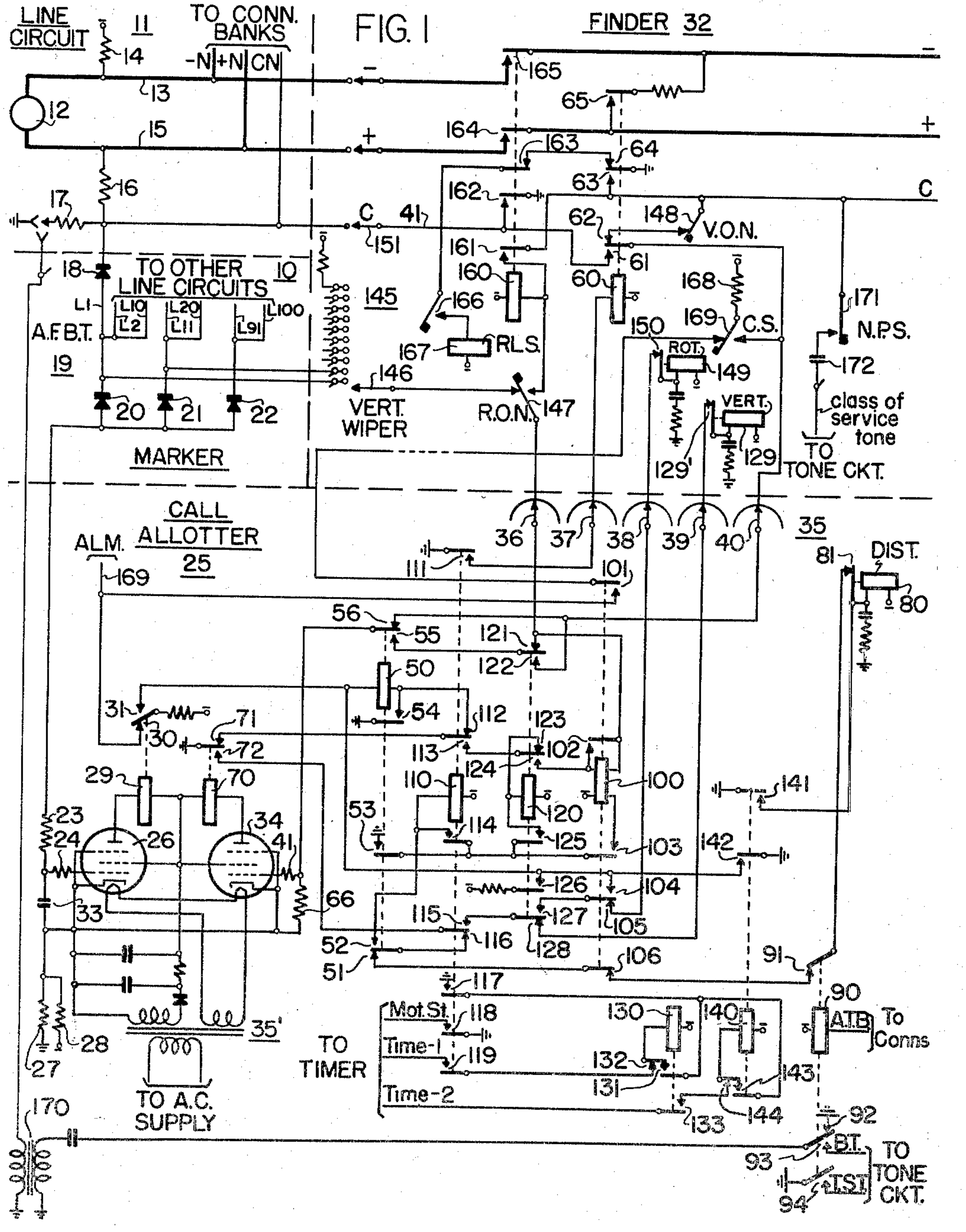
Fig. 1 is a schematic diagram of the relayless line circuit, line finder, marking circuit and call allotter embodying the present invention.

Referring now to Fig. 1, in the preferred embodiment, the system herein provided is for a 100 line telephone exchange. Line circuits 10 are preferably divided into 10 groups and each of the groups having 10 lines.

Each line circuit, such as line circuit 11 hereinafter referred to as line 1, comprises a conventional substation instrument 12. Connected thereto is a conductor 13 of line 1 which is connected to negative battery through resistor 14. A conductor 15 of line 1 is connected to ground or positive battery through serially connected resistors 16 and 17. When the substation instrument 12 is in the resored position, thereby opening the loop circuit of line 1, the junction of resistors 16 and 17 is at ground potential. When the substation instrument 12 is in the operated position, thereby closing the loop circuit of line 1, the junction of resistors 16 and 17 is at a negative potential with respect to ground of a suitable amount such as an amount equal to ⅓ of the battery voltage.

The negative potential value at said junction will depend upon the design characteristics of the line circuits.

Line circuit rectifiers or asymmetrical conductors, such as germanium diode rectifier 18 for line circuit 1, are connected so as to be conductive only when the corresponding line circuit loop is completed while preventing the potential on another busy line from appearing in its own associated line circuit.

The line circuits 10 are adapted for use in the Strowger type system, as well as in a rotary, all-relay or electronic system. All the line circuits in a group are connected to the same level in the finder banks, as shown in Fig. 1, when a Strowger type finder is used. And when using an all-relay finder, all the line circuits in a group are connected to the same "tens" relay multiple. When using a rotary type finder the lines may be connected to the finder banks in any manner desired, but the grouping arrangement of the start leads L1—L100 is preferably retained to minimize the shunt effects of non-conducting line circuit rectifiers.

For finder start and bank level marking, a suitable marker circuit 19 is herein provided comprising a group of common rectifiers or asymmetrical conductors, such as rectifiers 20–22. The start side of the common rectifiers, such as rectifiers 20–22, extends through resistors 23 and 24 to the control grid of electron tube 26 in a call allotter 25. For finder start and line testing, an electronic call allotter 25 is herein provided. The cathode of vacuum tube 26, which is preferably a sharp cut-off tube, is biased negative in respect to ground by a voltage divider comprising resistors 27 and 28, which is connected across the exchange battery. The bias voltage for tube 26 is set to provide a value of plate current sufficient to insure operation of relay 29 when there are no lines waiting for a finder, such as finder 32 herein provided. Thus, with no lines waiting, the control grid-cathode voltage on tube 26 is positive and plate current flows at a maximum value. Condenser 33 and resistor 23 constitute a low pass filter, which prevents line noises from affecting the operation of tube 26. Resistor 24 is provided to limit the grid current of tube 26 when the control grid-cathode voltage is positive. A suitable circuit, such as a pulsing circuit, comprising tube 34 is herein provided to function as a calling line detector for line group testing and for pre-selecting an idle line finder.

Plate voltage for the start tube 26 and line test tube 34, which is also preferably a sharp cut-off tube, is obtained from an alternating current source by means of a conventional power supply 35′.

In operation, as previously noted, tube 34 functions as a calling line detector. This tube is also used for line group testing, when required, and is further used for preselecting idle line finders. Before a connection can be extended from line 11, an idle finder must be pre-selected. Therefore, the control grid of tube 34 is normally connected to wiper 40 of rotary distributor switch or finder selecting switch 35 in the call allotter 25. When the wiper 40 rests on a bank contact to which is connected an idle finder-connector link or finder-selector link, tube 34 is biased beyond cut-off by the negative battery potential extending over the "C" conductor from a connector (such as the negative potential standing on the "C" conductor through the upper winding of relay 220 and the V. O. N. contacts 213 of the connector of Fig. 2, for example) or selector over the following path: control grid of tube 34, resistor 41, contacts 56, wiper 40, contacts 62, V. O. N. springs 148, and the "C" conductor of a connector or a selector. Resistor 66 has a high resistive value to prevent seizure of the connector or selector over the "C" conductor.

If wiper 40 rests on the bank contact of a busy link, or one out of service because of testing or fuse failure, the bank contact will either be opened or grounded, thereby impressing either a zero or a positive potential on tube 34. Resistor 41 limits the grid current of tube 34 when the grid is driven positive. With zero or positive potential on the grid of tube 34, the plate current of tube 34 is at a maximum value, thereby energizing relay 70. When relay 70 operates, contacts 71 open to prevent relay 50 from operating and contacts 72 close to operate a driving circuit to a distributor switch magnet 80 over the following path: battery, magnet 80, contacts 81, contacts 91, contacts 106, contacts 51, contacts 116, contacts 72 and ground. The distributor magnet 80 operates to interrupt its own operating circuit at contacts 81 and it deenergizes to step the wipers of the rotary switch 35 to the next bank contacts. When the wipers rest on an idle link, negative battery is forwarded from the C lead of the idle link as described above, thereby biasing tube 34 to cut-off. Relay 70 releases when tube 34 stops conducting and contacts 72 break to open the driving circuit to the distributor magnet 80. Thus, tube 34 tests for an idle line finder, and completes a driving circuit for the distributor switch 35 until the wipers thereof encounter an idle line finder. The system is now in condition to respond to an incoming call, since an idle line finder is pre-selected.

When a call is initiated over line 11, the potential at the junction of resistors 16 and 17 changes from zero to a negative potential of ⅓ of the exchange voltage. The voltage is impressed on the control grid of tube 26 through rectifiers 18 and 20 and resistors 23 and 24. Tube 26 is consequently biased beyond cut-off and stops conducting. Normally operated relay 29 restores and contacts 31 close to energize transfer relay 50 over the following path: battery, contacts 31, relay 50, contacts 112, contacts 71 and ground.

Restoration of relay 29 also removes resistance battery from lead 169 leading to an alarm circuit (not shown). This alarm circuit is so designed that it will give an automatic trouble alarm after a certain period of time has elapsed after resistance battery is first removed from lead 169. If resistance battery is replaced on lead 169 before the end of the fixed period of time, then the alarm circuit will be reset and no alarm will be given. If the resistance battery is then subsequently disconnected from lead 169, it will be necessary for the certain fixed time period to elapse without resetting before an alarm will be given. The utility of this alarm circuit operation will be apparent as further study of the complete circuit operation is made.

Transfer relay 50 operates and contacts 54 close to complete a holding circuit for relay 50. Contacts 55 close to transfer the control grid of tube 34 to the vertical wiper of the pre-selected finder 32 through wiper 36 of the rotary switch 35. Contacts 53 close to prepare holding circuits for relays 110 and 120. Contacts 51 break to open a second point in the driving circuit to the distributor magnet 80. Contacts 52 close to prepare an operating circuit to relay 110.

The vertical wiper 146 is normally free from potential when finder 32 is idle. The control grid-cathode voltage of tube 34 is thus changed from beyond cut-off to zero potential by the transfer of contacts 55 over the following path: vertical wiper 146, R. O. N. springs 147, wiper 36, contacts 121 and 55 and resistor 41, causing relay 70 to operate. Contacts 72 close to energize relay 110 over the following path: ground, contacts 72, contacts 116, contacts 52, relay 110 and battery.

Relay 110 operates, and contacts 111 close to energize relay 60 of the line finder 32 over the following path: battery, relay 60, wiper 37, contacts 111 and ground. Contacts 113 close to prepare an operating circuit for relay 120. Contacts 114 close to provide a holding circuit for relay 110, since contacts 116 over the first operating circuit break. Contacts 115 close to complete an operating circuit to a vertical magnet 129 of the line finder 32. Contacts 117 close to prepare locking circuits for relays 130 and 140. Contacts 118 and 119 close to prepare energizing circuits to the relays 130 and 140.

Relay 60 operates, and contacts 65 close to seize the selector or connector associated with the line finder 32. Contacts 63 ground the "C" lead and contacts 64 break to open a second point in the operating circuit to a release magnet 167. Contacts 61 close to prepare a circuit for connecting the "C" conductor 41 to the control grid of tube 34 through the wiper 40 of the rotary distributor switch 35.

When contacts 115 close, the vertical magnet 129 operates over the following path: battery, magnet 129, contacts 129', wiper 39, contacts 128, contacts 115, contacts 72 and ground, thereby stepping the line finder 32 to the first level of the bank contacts 145. The vertical magnet 129 operates in a self interrupting manner to step the finder bank wipers and the vertical wiper 146 in a vertical direction until the bank level in which the calling line is encountered by the line finder 32, the level being marked by the negative potential standing on the associated contact in the bank of contacts 145. Until wiper 146 encounters the negative potential which indicates that the calling line level has been encountered, tube 34 continues to conduct, thereby maintaining relay 70 operated. Relay 70 remaining operated continues to complete the vertical stepping circuit to magnet 129. After the first step, the V. O. N. springs 148 open and V. O. N. springs 166 close to prepare an operating circuit to release magnet 167.

When the line finder 32 encounters the calling line level (which in the example shown is the first level), the negative potential at the junction of the resistors 16 and 17 is impressed on the control grid of tube 34 over the following path: junction of resistors 16 and 17, rectifier 18, first bank level contact of bank 145, vertical wiper 146, R. O. N. springs 147, wiper 36, contacts 121 and 55, resistor 41 and the control grid of tube 34. Tube 34 is consequently biased beyond cut-off, thereby de-energizing relay 70.

Relay 70 releases, and contacts 72 break to open the driving circuit to the vertical magnet 129 of the line finder 32. Contacts 71 close to energize relay 120 over the following path: battery, relay 120, contacts 123, contacts 113, contacts 71 and ground. Relay 120 operates, and contacts 125 close to complete a holding circuit for relay 120. Contacts 121 open and 122 close to transfer the grid of tube 34 to the "C" wiper 151 of the finder 32 over the following path: "C" lead 41, contacts 61, wiper 40, contacts 122, contacts 55, resistor 41 and the control grid of tube 34. Contacts 126 close to lock relay 50 operated and contacts 127 close to prepare a driving circuit to the rotary magnet 149 of the line finder 32.

When contacts 121 opened, the negative potentials replaced by zero potential on the grid circuit of tube 34 and consequently relay 70 is again energized. Relay 70 operates and closes the circuit to the rotary magnet 149 which operates to cause the finder 32 to take the first rotary step. The rotary magnet 149 operates in a self-interrupting manner through contacts 150 until the "C" wiper 151 encounters the negative battery standing on the bank contact associated with the calling line. After the first rotary step, R. O. N. springs 147 transfer to prepare an operating circuit for relay 160.

When the wiper 151 encounters the calling line (which in the example shown is connected to the first bank contact in the first level), the negative potential at the junction of resistors 16 and 17 is impressed on the grid of tube 34 over the following path: junction of resistors 16 and 17, "C" wiper 151, contacts 61, wiper 40, contacts 122, contacts 55, resistor 41 and the control grid of tube 34. Tube 34 is again biased beyond cut-off thereby de-energizing relay 70.

Relay 70 releases and contacts 72 break to open the driving circuit to the rotary magnet 149 and contacts 71 close to energize relay 160 in series with relay 100 over the following path: battery, relay 160, R. O. N. springs 147, upper winding of relay 100, contacts 124, contacts 113, contacts 71 and ground.

Relay 100 operates and contacts 101 close to complete a circuit through resistance 168 and battery to the alarm lead 169, thereby re-setting the alarm circuit. Contacts 102 close to short circuit the upper winding of relay 100 and contacts 103 close to complete a holding circuit for relay 100. Contacts 105 break to open a point in the rotary driving circuit of the finder 32. Contacts 106 break to open a point in the driving circuit to the distributor magnet 80 of the call allotter 25.

Relay 160 operates and contacts 164 and 165 close to connect the talking conductors of the connector or selector to the talking conductor of line 1. Contacts 161 close to hold relay 160 operated over the following path: battery, relay 160, contacts 161 to ground on the "C" lead from the subsequent switch. Contacts 162 close to ground the "C" wiper 151, whereby removing the start signal from the control grid of tube 26, provided that no other lines are waiting, and also grounds the control grid of tube 34.

Grounding of the junction of resistors 16 and 17 renders the tube 26 conducting, thereby operating relay 29 to place battery on contacts 30. Tube 34 is also rendered conductive by ground on the control grid through wiper 40 to energize relay 70. Relay 70 operates, and contacts 72 close to short circuit relay 50 over the following path:

ground, contacts 72, contacts 115, contacts 127, contacts 104, relay 50, contacts 54 and ground.

Relay 50 releases, and contacts 53 open to release relays 110, 120 and 100 over previously described paths for holding the same. For completing a driving circuit to distributor magnet 80, contacts 106, contacts 51, contacts 116 and contacts 72 are closed, thereby stepping the wipers of the rotary distributor switch 35 until an idle line finder is selected in a manner previously described.

When relay 110 released, contacts 111 opened to de-energize relay 60 over a path previously described for operating the same. Contacts 102 open when relay 100 releases to open the operating circuit of relay 160; however, relay 160 is held in a manner previously described. When an idle finder is found, relay 70 restores in a manner previously described, enabling relay 50 to re-operate if other calls are waiting.

In the event that a finder switch fails to operate or to switch through or to release the call allotter in a fixed time determined by the spacing of the timing ground pulses on the Tine-1 and Tine-2 leads, relays 130 and 140 operate to advance the distributor switch 35 one step. Relay 130 operates over the following path: Tine-1, contacts 119, contacts 132, relay 130 and battery. Contacts 131 close to lock relay 130 over the following path: ground, contacts 117, contacts 131, relay 130 and battery. Contacts 133 close to energize relay 140 over the following path: Tine-2, contacts 133, contacts 144, relay 140 and battery.

Relay 140 operates upon receipt of a ground pulse on Time-2, and contacts 141 close to drive the distributor magnet 80 over the following path: battery, magnet 80, contacts 141 and ground.

Contacts 142 close to short circuit relay 50, thereby releasing the same. Contacts 143 close to complete a locking circuit for relay 140 through contacts 117.

When relay 50 restores, it opens the locking circuit to whichever of the relays 110, 120 and 100 may be operated. Relay 110 releases and opens the locking circuit to relays 130 and 140 which restore. The DIST. magnet 80 will then operate in a self-interrupting manner to locate another idle finder-connector link in the manner previously described.

In the event that tube 34 fails to operate relay 70 upon the operation of relay 50, the alarm circuit will not be reset since relay 100 will not be operated to close contacts 101 and hence will operate following a pre-determined time interval.

In the event that tube 26 fails to maintain relay 29 operated while no calling lines are waiting for connection to a link, a finder switch will start, but will not find any markings in the vertical bank. The finder then contacts the 10th level, at which negative potential is permanently connected to the associated contact in the vertical bank 145, and rotates to the 11th step where the cam springs 169 operate. When the cam springs 169 operate, resistance 168 and battery are connected to wiper 40 to effect a switch through operation in a manner previously described. However, the cam springs 169 remove resistance 168 and battery from contacts 101 extending to the alarm circuit. Hence the alarm circuit will not be reset, causing an alarm to be given after a pre-determined time interval.

When all line finders become busy, normally operated relay 90 restores to prevent the operation of the distributor switch by opening contacts 91 and connecting the busy tone circuit to the primary winding of induction coil 170 through contacts 93. The connectors are individually connected to the line finders so that when a connector is seized, a relay therein releases a ground connection to the busy relay 90. When all the connectors or finders are seized, relay 90 restores.

The line resistors, such as resistor 17, are connected to ground through the secondary winding of the induction coil 170, whereby busy tone will be heard by subscribers subsequently attempting to make calls. The busy tone will not affect lines which have been seized by finders or connectors, as the junction point of the line resistors such as resistors 16 and 17 are directly connected to ground in the switch.

In order to provide for a class of service tone, the "C" conductor 41 has been split in the finder 32 between relays 160 and 60. When relay 160 is operated it locks to ground on the "C" conductor on the connector side of the splitting point by way of contacts 161 and connects direct ground on the "C" conductor 41 on the line side of the splitting point by way of contacts 162. Normal post springs are provided to permit the class of service tone conductor to be connected through a condenser 172 on the "C" conductor on the connector side of the splitting point of any desired level.

Figures 2, 3:
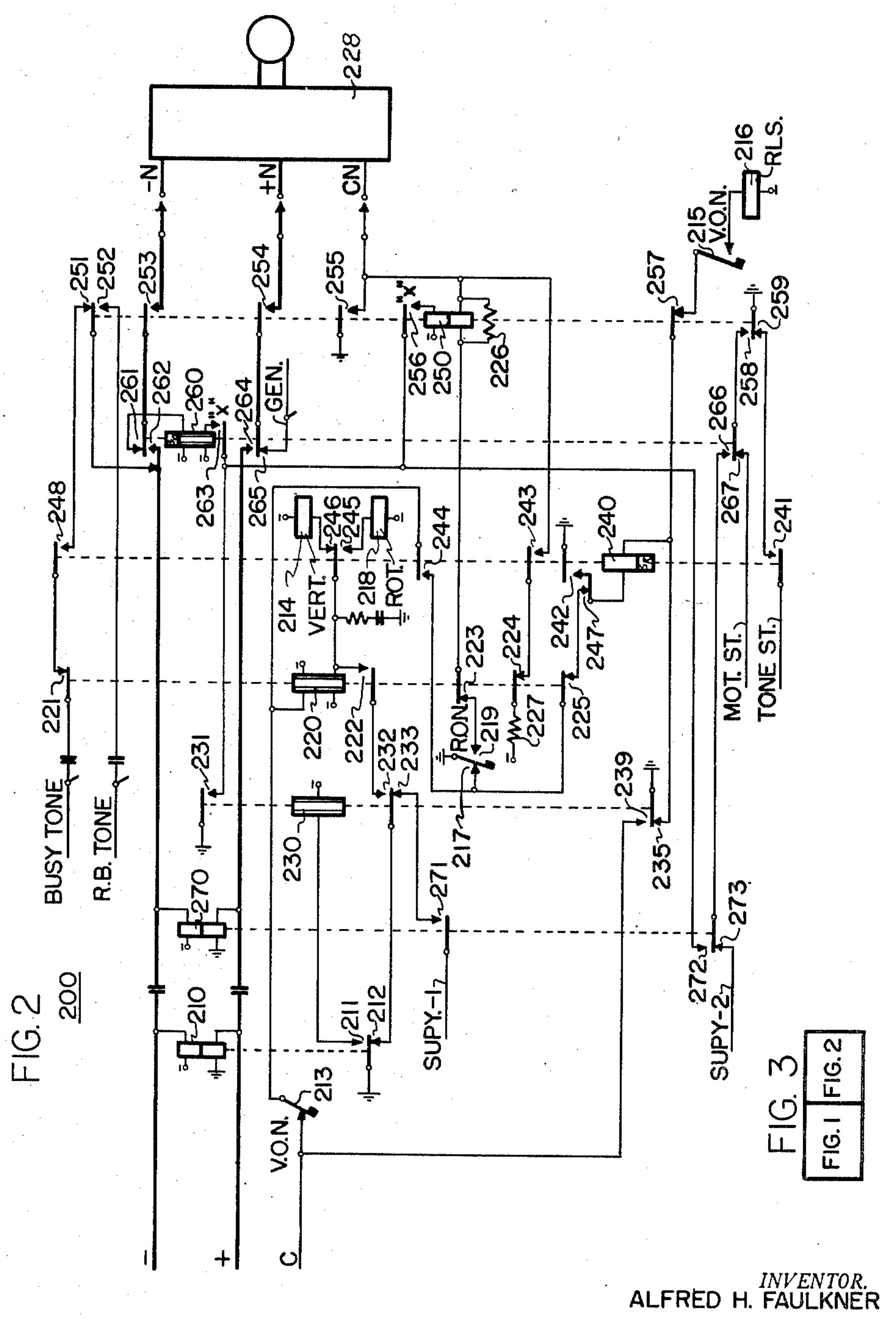
Fig. 2 is a schematic diagram of a camp-on-busy connector switch.
Fig. 3 is a block diagram illustrating the position of the circuits having a camp-on-busy connector.
Figure 4:
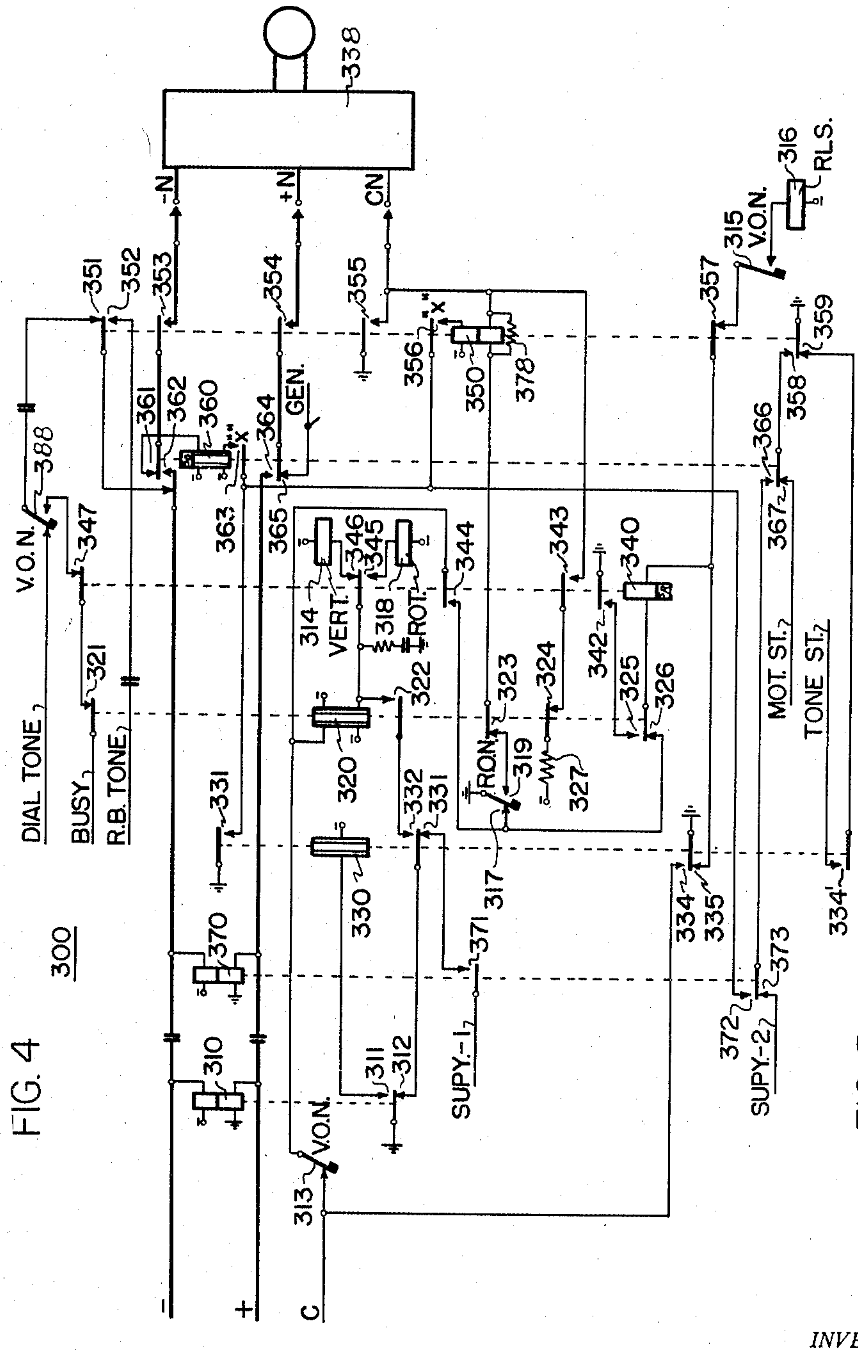
Fig. 4 is a schematic diagram of a non-camp-on-busy connector.
Figure 5:
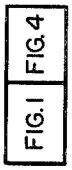
Fig. 5 is a block diagram illustrating the position of the circuits having a non-camp-on-busy connector.

For extending the connection from the line finder 32 to the called line circuit, suitable means are provided, such as the connectors shown in Figs. 2 and 4. The connector shown in Fig. 2 is provided when a camp-on-busy connector is desired, and the connector shown in Fig. 4 is provided when a non-camp-on busy connector is desired. The connectors are individually connected to a line finder. The connector circuits, herein provided, differ from the conventional connectors in that a novel busy test circuit is herein provided, which is necessitated by the novel line circuit. The usual busy test relay has been eliminated, hence the connector circuits shown require only seven relays, whereas the standard connectors require eight relays. According to the present invention a relay serves the dual function of a busy test relay and a switch through relay.

For extending a connection from the line finder to the called line circuit a suitable connector switch 200 is herein provided arranged with respect to Fig. 1 as shown in Fig. 3. The connector switch 200 is conventional, except for the special busy circuit necessitated by the novel line circuit. It should be noted that in the connector switch 200, relay 250 serves the dual function of providing a busy test relay and a switch through relay.

Connector switch 200 provides a camp-on-busy operation in that the connector wipers will remain on the selected called line bank contacts until the called line is free to receive the incoming call.

In operation, the connector 200 is directly connected to the line finder 32 and is seized thereby in response to the closure of contacts 65 in Fig. 1. Contacts 65 close to complete the loop circuit over the "+" and "−" conductors of connector 200 to energize the line relay 210 of the connector 200 over the following path: battery, relay 210, contacts 65, relay 210 and ground. Relay 220 is energized over the following path: ground, contacts 63, "C" conductor, V. O. N. springs 213, relay 220 and battery.

Relay 210 operates and contacts 211 close to energize slow-to-release relay 230 over the following path: ground, contacts 211, relay 230 and battery.

Relay 220 operates, and contacts 221 break to open a point in the busy tone circuit. Contacts 222 close to prepare the vertical stepping circuit and contacts 223 break to open a point in the circuit to test relay 250 and contacts 224 open to further open the circuit to test relay 250. Contacts 225 break to open a point in the operating circuit to relay 240.

To further prepare the vertical stepping circuit to vertical magnet 214, relay 230 operates to close contacts 232 and also to close ground to the C conductor at contacts 239 to mark the link busy in the distributor banks. No provision for dial tone has been shown in this circuit, but it can be readily provided in the conventional manner as shown in Fig. 4.

For stepping the connector 200 in the vertical direction, the substation 12 transmits the first series of digital impulses to interrupt the operation of line relay 210 in response thereto. The interruption of line relay 210 opens and closes contacts 212 to operate the vertical magnet 214 over the following path; ground, contacts 232, contacts 222, vertical magnet 214 and battery.

After the first vertical step, V. O. N. springs 213 open to de-energize the upper winding of relay 220 over a previously described path for operating the same, and V. O. N. springs 215 close to prepare an operating circuit to release magnet 216 and to slow-to-release relay 240.

Relay 220 being a slow-to-release relay, remains operated until the completion of the first series of digital impulses and relay 240 does not operate until the completion of the first series of digital impulses.

Relay 220 releases and contacts 225 close to energize relay 240 in series with the release magnet 216 over the following path: ground, R. O. N. springs 217, contacts 225 and 247, relay 240, contacts 257, V. O. N. springs 215, release magnet 216 and battery. Release magnet 216 does not operate in series with relay 240.

Relay 240 operates, and contacts 244 close to reoperate relay 220 over the following path: battery, relay 220, contacts 244, R. O. N. springs 217 and ground. Contacts 245 close to transfer the impulse stepping circuit to rotary magnet 218 and contacts 243 close to prepare an operating circuit for a switch through relay 250. Contacts 242 close to complete a locking circuit for relay 240. Contacts 241 close to complete tone start circuit. Relay 240 locks, before relay 220 is operated, through the make before break contacts 242 and 247.

For stepping the connector switch 200 in the rotary direction, the substation 12 transmits the second series of digital impulses to interrupt the operation of line relay 210 in response to the operation of the second series of digital impulses. The rotary magnet 248 is energized by the following stepping circuit: ground, contacts 212, contacts 232, contacts 222, contacts 245, rotary magnet 218 and battery. After the first rotary step, R. O. N. contacts 219 close to prepare an operating circuit to relay 250 and contacts 217 break to de-energize slow-to-release relay 220. Relay 220 releases upon the completion of the second series of digital impulses.

The restoration of relay 220 closed contacts 223 and 224 to prepare an energizing circuit to the lower winding relay 250 in shunt with resistor 226 and in series with resistor 227 over the following path: ground, R. O. N. contacts 219, contacts 223, relay 250 and resistor 226, contacts 243, contacts 224, resistor 227 and battery.

Line circuit 228 herein provided for the called line, is similar to the line circuit 11. The resistors 226 and 227 are so proportioned that the negative potential impressed on the "CN" wiper is lower than the potentential required to bring about the release of relay 29 of the call allotter 25 in Fig. 1. This result may be obtained by making resistors 226 and 227 of the connector 200 proportional to resistors 27 and 28 of the call allotter.

If the called line is busy the "CN" conductor in the banks of connector 200 is connected to ground. As a result thereof, the lower winding of relay 250 is short circuited, thereby preventing the operation thereof. The calling party receives busy tone in a conventional manner through contacts 221, contacts 248 and contacts 251, but may hold the connection until the called line becomes free.

When the called line becomes idle, ground is removed from the "CN" lead in the called line circuit and relay 250 is energized over the following path: battery, resistor 227, contacts 224, contacts 243, lower winding of relay 250, contacts 223 and R. O. N. contacts 219 to ground. Relay 250 operates and contacts 255 close to place ground on the "CN" wiper. Contacts 253 and 254 close to switch the "—N" and "+N" conductors of called line 219 through to ringing generator and negative battery through ring cut-off relay 260 so that ringing current is now applied to the called line. Contacts 257 break to open the locking circuit to relay 240, thereby releasing relay 240. Contacts 251 break to open the busy tone circuit and contacts 256 close to complete a holding circuit for relay 250 over the following path: battery, relay 250, contacts 256, contacts 231 and ground. It is apparent, therefore, that the relay 250 serves the dual function as a busy test relay and a switch through relay.

When the called subscriber removes the handset, relay 260 operates to open contacts 261 and 265 and effect the ring cut-off. It also closes contacts 262 and 264 to thereby complete a circuit to energize the back bridge relay 270 over the loop circuit in a manner similar to that previously described for the energization of relay 210 and it also completes the talking circuit. When the calling party restores the handset, relay 210 releases and contacts 211 break to release relay 230. Contacts 231 break to release relays 250 and 260. Contacts 235 close to operate the release magnet 216 over the following path: ground, contacts 235, contacts 257, V. O. N. spring 215, release magnet 216 and battery.

Referring now to Figs. 1 and 4, for extending a connection from the line finder to the called line, a suitable connector switch 300 is herein provided. The connector switch 300 is conventional, except for the special busy test circuit necessitated by the novel line circuit. It should be noted that in the connector switch 300, a relay serves the dual function of providing a busy test relay and a switch through relay.

Connector switch 300 provides a non-camp-on busy operation in that the connector switch will not remain on the selected called line bank contacts, if the called line is initially busy.

In operation, the connector switch 300 is directly connected to the line finder 32 and is seized thereby in response to the closure of contacts 65 in Fig. 1. Contacts 65 closing completes the loop circuit over the "+" and "—" conductors of connector 300 to energize the line relay 310 of the connector 300 over the following path: battery, relay 310, contacts 65, relay 310 and ground.

Relay 320 is energized over the following path: ground, contacts 63, "C" conductor 41, V. O. N. springs 313, relay 320 and battery.

Relay 310 operates, and contacts 311 close to energize slow-to-release relay 330 over the following path: ground, contacts 311, relay 330 and battery.

Relay 320 operates and contacts 321 open to break the busy tone circuit and contacts 322 close to prepare a vertical stepping circuit. Contacts 323 break to further open an operating circuit to the lower winding of testing and switching through relay 350. Contacts 324 break to further open an operating circuit to the lower winding of testing relay 350, and contacts 326 break to open and operating circuit to slow-to-release relay 340.

Dial tone is now transmitted to the calling line through contacts 351 and V. O. N. springs 388. Relay 330 operates to close contacts 332 and relay 320 operates to close contacts 322 for preparing a vertical stepping circuit to vertical stepping magnet 314. Contacts 331 close to prepare a holding circuit for ring cut-off relay 360 and contacts 334 close to ground the "C" conductor. For stepping the connector 300 in the vertical direction, the substation 12 transmits the first series of digital impulses to interrupt the operation of line relay 310 in response thereto. The interruptions of line relay 310 open and close contacts 312 to operate the vertical stepping magnet 314 over the following path: ground, contacts 312, contacts 332, contacts 322, contacts 346, vertical magnet 314 and battery.

After the first vertical step, V. O. N. spring 313 transfers to de-energize relay 320 over a previously described path for operating the same. V. O. N. spring 315 transfers to prepare an operating circuit to release magnet 316 and slow-to-release relay 340. V. O. N. spring 388 transfers to open the dial tone circuit. Relay 320 being a slow-to-release relay, remains operated until the completion of the first series of digital impulses. Relay 320 releases and contacts 326 close to energize relay 340 in series with the release magnet 316 over the following path: ground, R. O. N. contacts 317, contacts 326, relay 340, contacts 357, V. O. N. spring 315, release magnet 316 and battery. Release magnet 316 does not operate when in series with relay 340.

Relay 340 operates and contacts 344 close to reoperate relay 320 over the following path: battery, relay 320, contacts 344, R. O. N. spring 317 and ground. Contacts 345 close to transfer the impulse stepping circuit to the rotary magnet 318 and contacts 343 close to prepare an operating circuit for the switch through and testing relay 350. Contacts 342 close to complete a locking circuit for relay 340 through contacts 325. Contacts 347 break to open the busy tone circuit.

For stepping the connector 300 in the rotary direction, the substation 12 transmits the second series of digital impulses to interrupt the operation of line relay 310 in response thereto. The rotary magnet 318 is energized by the following stepping circuit: ground, contacts 312, contacts 332, contacts 322, contacts 345, rotary magnet 318 and battery. After the first rotary step, R. O. N. contacts 319 close to prepare a testing circuit to relay 350 and contacts 317 break to de-energize slow-to-release relay 320.

Relay 320 releases upon the completion of the second series of digital impulses. The restoration of relay 320 closes contacts 323 and 324 to prepare an energizing circuit to the lower winding of relay 350 in shunt with resistor 378 and in series with resistor 327 over the following path: ground, R. O. N. contacts 319, contacts 323, relay 350, resistor 326, contacts 343, contacts 324, resistor 327 and battery. Contacts 325 break to de-energize relay 340.

Line circuit 338, herein provided for the called line is similar to the line circuit 11 of Fig. 1. The resistors 378 and 327 are so proportioned that the negative potential impressed on the "CN" wiper is lower than the potential required to bring about the release of relay 29 of the call allotter 25 in Fig. 1. This result may be obtained by making resistors 378 and 327 of the connector 300 proportional to resistors 27 and 28 of the call allotter 25 shown in Fig. 1.

If the called line is busy the "C" conductor in the banks of connector 300 is connected to ground. As a result thereof, the lower winding of relay 350 is short circuited, thereby preventing the operation thereof.

After a short time delay, relay 340 releases and contacts 347 close to complete a busy tone circuit to the calling subscriber through contacts 321, contacts 347, V. O. N. spring 388 and contacts 351. Contacts 343 break to open the operating circuit to the testing relay 350, thereby preventing operation thereof if in the event that the called line is initially busy and subsequently becomes free.

In the event that the called line is idle, relay 350 is energized over the following path: battery, resistor 327, contacts 324, contacts 343, relay 350, contacts 323, R. O. N. spring 319 and ground. Relay 350 operates and contacts 355 close to place ground on the "CN" wiper. Contacts 353 and 354 close to switch the "—N" and "+N" conductors of called line 338 through to ringing generator and negative battery through ring cut-off relay 360. Contacts 357 break to open the circuit to the release magnet 316. Contacts 351 are opened to open the busy tone circuit and contacts 352 close to complete the ring back tone circuit. Contacts 356 close to complete a holding circuit for relay 350 over the following path: battery, relay 350, contacts 356, contacts 331 and ground. Relay 340 releases after the testing operation is completed.

When the called subscriber removes the handset, relay 360 operates and contacts 361 and 364 close to complete a talking circuit through connector 300. Contacts 365 open to remove the ringing generator. Contacts 363 close to complete a holding circuit for the ring cut-off relay 360. The back bridge relay 370 is energized over the loop circuit in a manner similar to that for the operation of relay 310.

When the calling party restores the handset, relay 310 releases and contacts 311 break to de-energize relay 330. Relay 330 releases and contacts 331 break to release relays 350 and 360. Contacts 335 close to operate the release magnet 316 over the following path: ground, contacts 335, contacts 357, V. O. N. spring 315, release magnet 316 and battery.

It is to be understood that variations and modifications may be affected without departing from the scope of the appended claims.

I claim:

1. In a telephone system having a plurality of lines, a relayless line circuit for each line comprising a network for each line and means for producing a potential in the network associated with a calling line on initiation of a call, a plurality of rectifiers, a common circuit for said plurality of said lines connected to each of said networks through one of said rectifiers, condenser means associated with said common circuit for preventing sustained direct current flow in said common circuit, said rectifiers arranged to prevent any current flow from one network to another and allowing the establishment of said potential in said common circuit, means for extending connections from said lines, and means controlled by said potential in said common circuit for operating said last means to cause it to connect with the line having a potential in its network.

2. In a telephone system, a plurality of subscriber lines, automatic switches common to said lines for extending connections therefrom, a vacuum tube having grid and plate circuits, a plurality of rectifiers, a resistance network individual to each line, a circuit common to said networks connected to the grid circuit of said tube and connected to each of said networks through one of said rectifiers, means operated on the initiation of a call from any of said lines for establishing a potential in its individual network, said potential applied through said one rectifier to said common circuit and to said grid circuit, all said rectifiers except said one rectifier arranged to prevent a potential in said individual network from being established in any other network, means in the plate circuit of said tube effective responsive to the application of said potential to said grid circuit to cause one of said switches to be operated to extend a connection from the calling line, and condenser means associated with said common circuit for preventing sustained direct current flow in said common circuit.

3. In a combination adapted for use in a telephone system, a plurality of subscriber lines, automatic equipment common thereto for finding a calling line and extending a connection therefrom, means for impressing a potential on a calling line, a resistor rectifier network individually associated with each of said lines and having said potential produced at a point on said resistor to identify the calling line, a vacuum tube having a control grid and plate circuit, one end of each rectifier commonly connected to said control grid and the other end of each rectifier connected to its associated resistor, each rectifier so arranged as to enable the transmission of a potential produced on its associated resistor to said control grid of said tube to condition said plate circuit, said rectifiers also arranged to prevent the transmission of a potential from the resistor associated with any other line to its associated line, means in said plate circuit operated when said plate circuit is conditioned to operate the automatic equipment to find a calling line in accordance with said identifying potential and to a calling line, and condenser means associated with said grid and said common connection for preventing sustained direct current flow between said common connection and said grid.

4. In a telecommunication system, a combination comprising a plurality of subscriber lines, a group of line finders having access to said lines, certain of said finders being idle and certain of said finders being busy, an allotter, means for operating said allotter, a vacuum tube controlling the operation of said means in response to the busy or idle condition of the line finders to cause said allotter to select an idle line finder, circuit means completed on initiation of a call for identifying a calling line, a second vacuum tube conditioned by said completed circuit means, means operated by said conditioned second vacuum tube to cause said first tube to control said selected idle finder, and means cooperating with said first vacuum tube to control said idle line finder to find said identified calling line.

5. In a combination adapted to be used in a telephone system including subscriber lines any one of which may initiate a call and a group of line finders some of which are idle and some of which are busy, a finder selecting switch, a finder selecting switch driving means, a vacuum tube having control grid and plate circuits, means in said plate circuit controlling the operation of said finder selecting switch driving means, a test circuit interconnecting said control grid and said finder selecting switch for controlling the operation of said plate circuit means to control the operation of said finder selecting switch driving means and to halt same when the finder selecting switch meets an idle finder to thereby select said idle finder, means including said tube operated in response to the initiation of a call from a calling line for causing said selected idle finder to find said calling line, and means operated when said selected idle finder finds said calling line for causing said plate circuit means to control said selecting switch driving means and said test circuit to cause said selecting switch to find another idle finder.

6. In a combination adapted for use in a telephone system including subscriber lines any one of which may initiate a call and a group of line finder switches some of which finders are idle and some of which finders are busy and all of which finders have an individual test contact means for impressing potential on an idle finder test contact, an allotter having a test wiper and a driving means for same, said test wiper driven by said driving means to contact busy finder test contacts and idle finder test contacts, a vacuum tube having control grid and plate circuits, means in said plate circuit effective on the application of a potential on said grid for controlling the operation of said test wiper driving means, a test circuit interconnecting said test wiper and said control grid for impressing said idle finder contact potential on the control grid of said tube when an idle finder contact is contacted by said test wiper, said plate circuit means effective on the impression of said potential on said control grid to control said test wiper driving means and halt same when test wiper contacts an idle finder test contact to select said idle finder, means including said tube operated on initiation of a call from a calling line for causing said selected idle finder to find said calling line, and means operated when said selected idle finder finds said calling line for causing said plate circuit means to control said driving means and said test circuit for causing said allotter to select another idle finder.

7. In a combination adapted for use in a telephone system having subscriber lines any one of which may initiate a call and a group of line finders and means associated with each finder for operating its associated finder, a switch, a driving means for successively associating said switch with said finders, a tube, a test circuit interconnecting said tube and said switch for conditioning said tube in accordance with the condition of a finder said switch is associated with, means operated by said tube when conditioned by an idle finder for terminating the operation of said driving means to thereby select said idle finder, means operated on initiation of a call from one of said lines thereafter effective to operate said associated means for operating said idle finder, a circuit completed by said means operated on initiation of a call for enabling said tube to be conditioned in accordance with the condition of the lines encountered by said operated finder, means operated by said tube when said tube is conditioned in accordance with a calling line for terminating the operation of said finder operating means to terminate the operation of said finder, and means thereafter effective for reoperating said driving means to successively associate said switch with other finders to select another idle finder.

8. In a telephone system having subscriber lines and equipment for extending said lines, a combination comprising a plurality of resistance networks individually associated with each of said lines, means for producing a potential on a network when a call is initiated by its associated line, a plurality of asymmetrical conductors some of which are individually connected at one end to a corresponding network, a plurality of connections, each connection joining together the other ends of said connected conductors associated with the lines having a certain relationship to each other to form a number of group junctures of similarly arranged resistance asymmetrical conductor networks, said connected conductors so arranged as to allow a potential produced on one resistance network to be established at a corresponding group juncture while preventing its establishment on any other resistance network, others of said asymmetrical conductors each individually connected on one end to one of said group junctures and commonly connected on the other end, said other conductors arranged to allow a potential established on any one of said group junctures to be established at said common connection while preventing the establishment of said potential at any other group juncture, means connected to said common connection and operated by a potential established at said common connection for causing said equipment to be operated in accordance with the potential established at one of said group junctures and produced on one of said resistance networks to thereby find a calling line and extend a connection therefrom, and condenser means associated with said last means and said common connection for preventing sustained direct current flow between said last means and said asymmetrical conductors.

9. In a telephone system including a plurality of subscriber lines with finder banks having terminals and line finders individually associated with said finder banks, a plurality of resistors each individually associated with said lines and means for producing a potential thereon when a call is initiated from an associated line, said resistors each individually connected to finder bank terminals individual to its associated line to thereby reproduce said potential on its associated terminals, a plurality of rectifiers each individually connected on one end to said resistors, a plurality of connections, each connection joining together the other ends of said rectifiers whose connected lines have a certain relationship to each other to form a number of groups of resistors and rectifiers, each group individually connected to a finder bank terminal, said rectifiers arranged to enable the potential on a resistor to be established on its associated group terminal when a call is initiated by a line in the group and preventing its establishment on any other resistor in said group and the individual terminals connected to any other resistor, another plurality of rectifiers connected on one end to each of said group connections and commonly connected at their other ends, said other plurality of rectifiers arranged to enable the potential on a group connection to be established at said common connection and preventing its establishment on any of said group finder bank terminals except that one connected to the group including the calling line, means associated with said last common connection conditioned by the potential established thereat for operating one of said line finders to search for and find said terminals having a potential thereon to thereby find said calling line, and condenser means associated with said last common connection and said last means for preventing sustained direct current flow between said common connection and said last means.

10. A system such as claimed in claim 9 in which said means conditioned by said potential includes a first electronic valve, a second electronic valve, means operated by said first valve when said potential is established at said common connection for causing said second valve to establish control over one of said line finders and for causing operation of said line finder, and means associated with said second valve operated by said valve when said finder encounters the terminal associated with said calling line and having said calling line potential thereon for terminating the operation of said line finder and the control of said second valve thereover.

11. In a telephone system having a plurality of subscriber lines arranged in groups and automatic switching mechanism associated with said lines for extending a connection from a calling line, a resistance network individual to each line, means effective whenever a call is initiated from one of said lines to produce a potential at a point in its associated network, a marking conductor for each line, a marking conductor for each group of lines, a connection from said point on each line to its marking conductor for producing said potential on said marking conductor, an individual connection from said point on all of a group of lines to the group marking conductor, a rectifier in each of said last connections separating the network of each line from any direct connection to the network of another line, each of said rectifiers arranged to prevent a potential produced in an unassociated network from appearing on its associated network and each rectifier effective to enable a potential produced in its associated network to be established on its associated group marking conductor, a conductor common to all of said groups of lines, connections from all said group marking conductors to said common conductor, rectifiers individually connected in each of said last connections for separating each group marking conductor from any direct connection with the group marking conductor of another group, each of said last rectifiers arranged to prevent the potential established at an unassociated group marking conductor from appearing on its associated group marking conductor and each of said last rectifiers effective to enable a potential established on its associated group marking conductor to be established on said common conductor, an electronic valve, a control electrode in said valve connected to said common conductor, the potential produced at the said point in any network when its associated line is initiating a call thereby established over said common conductor and at said control electrode, a circuit including the plate circuit of said tube, said control electrode rendered effective by said potential for controlling said last circuit including said plate circuit to cause said switching mechanism to be brought under control of the calling line for extending a connection therefrom, and condenser means associated with said common conductor for preventing sustained direct current flow between said common conductor and said control electrode at all times.

12. For use in a telephone system having a plurality of subscriber lines and finder switches having access to said lines through banks of contacts, said finders each individually associated with each said banks and each finder including means whereby they are operated in several successive directions to associate with a calling line, a pair of vacuum tubes each having a control grid and an anode, a circuit, means for completing said circuit and impressing a potential thereon when one of said lines is calling for marking said line in the banks of contacts, means for applying said potential to the control grid of one of said tubes, means in the plate circuit of said one tube operated by said potential on said last control grid, a circuit completed by said operated last means from the control grid of the other tube to one of said finder switches, said last circuit associated with certain of the contacts of the bank associated with said one finder switch by said switch when operated in one direction, means in the anode circuit of said other tube operated by said marking potential when said last circuit is associated with a bank contact corresponding to the group of lines including said calling line for causing said finder to be operated in another direction, and a last circuit completed through said finder to said other tube control grid and associated with other of said bank contacts on operation of said finder in said other direction for impressing said calling line marking potential on said other tube control grid when said finder and said last circuit are associated with the bank contacts individually corresponding to the calling line, said other tube plate circuit means then operated in response to said finder finding said calling line for terminating operation of said finder.

13. In a telecommunication system including a plurality of subscriber lines, finder banks with terminals terminating said lines and a group of line finders individually associated with said finder banks, some of said finders in an idle condition and some in a busy condition, an allotter, a first and second vacuum tube, said first tube effective to cause operation of said allotter and control its operation to test for and select an idle finder, a plurality of resistance asymmetrical conductor networks each associated with an individual line and commonly connected to said second vacuum tube, means operated on initiation of a call from any of said lines for producing a potential on the terminals terminating the calling line, said conductor networks serving to transmit said potential to said second vacuum tube and thereby condition said second tube, each said resistance asymmetrical conductor networks serving to prevent a potential produced on the terminals terminating any other line from being transmitted to the terminals terminating its line, means operated by said second vacuum tube when conditioned on initiation of a call by said transmitted potential for operating said selected idle finder to successively connect said first tube to the terminals of the bank associated with said finder, and means operated by said first tube when conditioned by the potential on a terminal terminating a calling line on connection thereto for terminating the operation of said finder operating means and control by said first tube over said finder.

14. In a telecommunication system, a combination comprising a plurality of subscriber lines, finder bank terminals, a group of line finders some of which are idle and some of which are busy, a first and second vacuum tube, each having control electrodes, means in the plate circuits of each said tubes, means for conditioning said first tube grid circuit to activate said first tube plate circuit means, means operated by said activated plate circuit means for contacting line finders, a circuit connected to said first tube control electrode when said operated means contacts an idle finder to condition said first tube electrode to deactivate its plate circuit means to thereby terminate operation of said finder contacting means and maintain said contacting means in contact with said idle finder, means for conditioning said second tube control electrode to activate its plate circuit means on initiation of a call from one of said lines, said last conditioning means including means for identifying a calling line terminal in the finder bank, means operated by said second tube activated plate circuit means for operating said idle finder and for conditioning said first tube control electrode to activate its plate circuit means, a circuit formed by said second tube activated plate circuit means connected to said control electrode of said first tube and brought into contact with said terminals by said operated line finder for conditioning said first tube electrode to deactivate said activated first tube plate circuit means to terminate further operation of said line finder when said last circuit is brought into contact with the identified calling line terminal, and means thereafter effective for conditioning said first tube control electrode to cause its plate circuit means to be activated for controlling said means for contacting line finders and for conditioning said second tube control electrode to deactivate its plate circuit means.

15. A combination adapted for use in a telephone system including subscriber lines having banks of contacts of which certain contacts are individual to each line and others of which contacts are common to a number of lines in a group, and a group of line finders individually associated with said banks, each said finders having a driving means for moving said finder, means for impressing potential on an idle finder of said group, a finder selector, a finder selector driving means, a vacuum tube having a control grid and plate circuit, means in said plate circuit to cause operation of said finder selector driving means, a circuit for supplying said potential to said control grid when the finder selector contacts an idle finder to control said means in the plate circuit to halt the operation of the finder selector driving means and thereby select said idle finder, another vacuum tube including a control grid circuit, means for impressing a potential on said last control grid circuit on initiation of a call from one of said lines and on one of said other and one of said certain contacts of the bank associated with said finder, means in the plate circuit of said other tube operated on impression of said last potential on said last control grid circuit for operating said driving means for moving said finder in one direction, a circuit interconnecting said first tube grid circuit and said line finder to transmit said potential on said one other contact to said first tube grid circuit for causing said first tube plate circuit means to terminate operation of said finder driving means and said one motion of said finder when said finder encounters said one other contact, means thereafter effective for operating said finder driving means to move said finder in another direction, another circuit interconnecting said first tube grid circuit and said line finder to transmit said potential on said certain contact to said first tube grid circuit for causing said first tube plate circuit means to terminate operation of said finder driving means to halt said other motion of said line finder when said line finder contacts the said one certain contact individual to the calling line.

16. For use in a telephone system having groups of subscriber lines and line finders having access thereto, said finders each including means for imparting motion in one direction to its finder for associating the finder with the group of lines including the calling line and for then imparting motion in another direction to said finder for associating the finder with the individual calling line in the group, a finder selecting switch, an electronic valve, means for operating said selecting switch to associate said switch successively with said finders, a test circuit interconnected successively with said finders by said selecting switch for conditioning said valve in accordance with the condition of the interconnected finder, means operated by said valve if conditioned by an idle finder for terminating the operation of said means for operating the finder selecting switch to thereby cause said switch to select said idle finder, another test circuit interconnecting said selected finder and said tube also prepared by said valve operated means, means operated for completing said other test circuit on initiation of a call from one of said lines and for initiating operation of said means for operating said selected finder in said one direction, said other circuit successively associated with said groups of lines when said finder is imparted one motion for conditioning said tube in accordance with the condition of said groups of lines, said valve operated means again operated when said valve is conditioned by a group of lines including the calling line for causing said finder to be operated in said other direction by said motion imparting means to thereby associate said finder with said calling line, and a last test circuit interconnecting said finder and said tube completed by said valve operated means when last operated and associated by said finder with the lines of said group for causing said valve to operate said valve operated means when said last test circuit and said finder are associated with said calling line for terminating the operation of said finder motion means and said finder.

References Cited in the file of this patent

UNITED STATES PATENTS

| | | |
|---|---|---|
| 2,152,889 | Jedrychowski | Apr. 4, 1939 |
| 2,242,776 | Clark et al. | May 20, 1941 |
| 2,295,032 | Deakin | Sept. 8, 1942 |
| 2,389,666 | Herrick | Nov. 27, 1945 |

(Other references on following page)

UNITED STATES PATENTS

| | | |
|---|---|---|
| 2,409,586 | Powell | Oct. 15, 1946 |
| 2,502,415 | Bray et al. | Apr. 4, 1950 |
| 2,543,534 | Powell | Feb. 27, 1951 |
| 2,574,224 | Oberman | Nov. 6, 1951 |
| 2,598,822 | Oberman | June 3, 1952 |

FOREIGN PATENTS

| | | |
|---|---|---|
| 409,670 | Great Britain | May 1, 1934 |

OTHER REFERENCES

Oberman, "The Bridge Marker Key Automatic System," pages 4 through 4.8; year: 1947.